United States Patent [19]

Sehanobish et al.

[11] Patent Number: 5,861,463
[45] Date of Patent: Jan. 19, 1999

[54] IMPACT-MODIFIED THERMOPLASTIC POLYOLEFINS AND ARTICLES FABRICATED THEREFROM

[75] Inventors: Kalyan Sehanobish, Friendswood; Shaofu Wu, Missouri City; Larry A. Meiske; Pak-Wing Steve Chum, both of Lake Jackson, all of Tex.

[73] Assignee: The Dow Chemical Company, Midland, Mich.

[21] Appl. No.: 741,648

[22] Filed: Oct. 31, 1996

[51] Int. Cl.$^6$ ...................................................... C08F 30/00
[52] U.S. Cl. ............................................................. 525/240
[58] Field of Search ............................................. 525/240

[56] References Cited

U.S. PATENT DOCUMENTS

| | | | |
|---|---|---|---|
| 3,050,494 | 8/1962 | Robbins et al. | 260/41 |
| 3,243,405 | 3/1966 | Boyer et al. | 260/41 |
| 3,645,992 | 2/1972 | Elston | 260/80.78 |
| 3,864,433 | 2/1975 | Tatsukami et al. | 260/897 |
| 3,959,558 | 5/1976 | MacKenzie, Jr. | 428/379 |
| 3,962,157 | 6/1976 | Nakano et al. | 260/17.4 R |
| 4,006,283 | 2/1977 | MacKenzie, Jr. et al. | 526/57 |
| 4,035,322 | 7/1977 | Tate et al. | 260/23 |
| 4,076,698 | 2/1978 | Anderson et al. | 526/348.6 |
| 4,087,485 | 5/1978 | Huff | 260/897 A |
| 4,088,714 | 5/1978 | Huff | 260/987 A |
| 4,203,882 | 5/1980 | Bertelli et al. | 260/28.5 A |
| 4,221,882 | 9/1980 | Huff | 525/240 |
| 4,291,138 | 9/1981 | Sato et al. | 525/247 |
| 4,311,807 | 1/1982 | McCullough, Jr. et al. | 525/197 |
| 4,375,531 | 3/1983 | Ross | 525/93 |
| 4,459,385 | 7/1984 | McCullough, Jr. et al. | 525/88 |
| 4,483,966 | 11/1984 | Suzuki et al. | 525/323 |
| 4,575,522 | 3/1986 | Breach et al. | 523/220 |
| 4,666,989 | 5/1987 | McCullough, Jr. et al. | 525/240 |
| 4,673,620 | 6/1987 | Shulman et al. | 428/379 |
| 4,748,206 | 5/1988 | Nogiwa et al. | 525/88 |
| 4,843,129 | 6/1989 | Spenadel et al. | 525/240 |
| 4,977,210 | 12/1990 | Kerth et al. | 525/53 |
| 4,997,884 | 3/1991 | Ilenda et al. | 525/71 |
| 5,011,891 | 4/1991 | Spenadel et al. | 525/211 |
| 5,026,798 | 6/1991 | Canich | 526/127 |
| 5,041,491 | 8/1991 | Turke et al. | 525/425 |
| 5,055,438 | 10/1991 | Canich | 502/117 |
| 5,118,753 | 6/1992 | Hikasa et al. | 524/525 |
| 5,246,783 | 9/1993 | Spenadel et al. | 428/461 |
| 5,272,236 | 12/1993 | Lai et al. | 526/348.5 |
| 5,278,272 | 1/1994 | Lai et al. | 526/348.5 |
| 5,300,581 | 4/1994 | Otawa et al. | 525/301 |
| 5,414,040 | 5/1995 | McKay et al. | 524/576 |
| 5,459,201 | 10/1995 | Shroff et al. | 525/197 |
| 5,532,315 | 7/1996 | Bonekamp et al. | 5525/71 |
| 5,576,374 | 11/1996 | Besto et al. | 524/451 |
| 5,580,920 | 12/1996 | McKay et al. | 524/576 |

FOREIGN PATENT DOCUMENTS

| | | | |
|---|---|---|---|
| 92318 | 10/1983 | European Pat. Off. | T08L 23/02 |
| 0209294 | 1/1987 | European Pat. Off. | C08L 23/04 |
| 63-210150 | 8/1988 | Japan | C08L 23/06 |
| 07-048458 | 2/1995 | Japan | C08J 5/18 |
| 94/03538 | 2/1994 | WIPO | C08L 23/04 |
| 94/06859 | 3/1994 | WIPO | C08L 23/04 |

OTHER PUBLICATIONS

Guest, M.J., and Daly, J.H., "Practical Aspects of Solid State Mechanical Spectroscopy for Polymers", 1993, pp. 141–198, *Polymer Yearbook*.

Anzuoni, A., "Polyurethane TPEs", 1989, pp. 114–116, *Modern Plastics Encyclopedia*.

Bortolini, W., "PP homopolymer", 1989, p. 88, *Modern Plastics Encyclopedia*.

Bucknall, C.B., and Page, C.J., "Rubber–toughening of plastics", 1982, pp. 808–816, *Journal of Materials Science*, vol. 17, No. 3.

Bucknall, C.B., 1977, pp. 1–106, *Toughened Plastics*, Applied Science Publishers Ltd., London.

Chou, C.J., et al., "Ductile–to–brittle transition of rubber–modified polypropylene, Part I Irreversible deformation mechanisms", 1988, pp. 2521–2532, *Journal of Materials Science*, vol. 23, No. 7.

Chou, C.J., et al., "Ductile–to–brittle transition of rubber–modified polypropylene, Part 2 Failure Mechanisms", 1988, pp. 2533–2545, *Journal of Materials Science*, vol. 23.

Cunha, A.M., and Pouzada, A.S., "Flexural Behaviour of Injection Moulded Polypropylene Plates", Apr. 5–8, 1993, Polymer Processing Society IX Annual Meeting, Manchester, pp. 71–72.

(List continued on next page.)

*Primary Examiner*—David W. Wu

[57] ABSTRACT

Melt processible thermoplastic compositions and method for making them are described, these compositions comprising a) a polypropylene matrix, b) at least about 25 percent (by weight based on the total composition) of an elastomeric impact modifier dispersed as discrete particles in the polypropylene matrix (a); and c) at least about 10 percent (by weight based on the total composition) of at least one homogeneous linear or substantially linear ethylene polymer dispersed as discrete particles in at least the impact modifier (b), the ethylene polymer having a molecular weight distribution less than 3.5 and a density of at least 0.04 g/cm$^3$ higher than the density of the impact modifier component (b), wherein the elastic modulus of the polypropylene (a) is at least 200 times greater than the elastic modulus of the impact modifier component (b).

These thermoplastic compositions have improved processability. Processes for fabricating articles from them are described. The articles made with these compositions have improved properties such as low temperature impact strength, improved percent elongation to break, greater stiffness, and improved weld line strength, making them useful for applications requiring both strength and flexibility in low temperature environments, such as automotive components and facia.

23 Claims, No Drawings

OTHER PUBLICATIONS

D'Orazio, L., et al., "Thermoplastic Elastomers from iPP/EPR Blends: Crystallization and Phase Structure Development", 1994, pp. 387–404, *Journal of Applied Polymner Science*, vol. 53.

D'Orazio, L., et al., "Polypropylene/ethylene–co–propylene blends: influence of molecular structure and composition of EPR on melt rheology, morphology and impact properties of injection–moulded samples", 1991, pp. 1186–1194, *Polymer*, vol. 32, No. 7.

Davies, J.K., "PP random copolymers", 1989, pp. 90–92, *Modern Plastics Encyclopedia*.

Echte, A., Chapter 2: "Rubber–Toughened Styrene Polymers", 1989, pp. 15–64, in *Rubber–Toughened Plastics*, Advances in Chemistry Series 222, American Chemical Society, Washington, D.C.

Edenaum, J., and Daniels, S., "Olefinic TPEs", 1989, p. 114, *Modern Plastics Encyclopedia*.

Green, M.W., "Injection molding thermoplastics", 1989, pp. 270–272, *Modern Plastics Encyclopedia*.

Goodier, J.N., "Concentration of Stress Around Spherical and Cylindrical Inclusions and Flaws", 1933, pp. 39–44, *Journal of Applied Mechanics*, vol. 55, No. 39.

Guth, E., "Theory of Filler Reinforcement", 1945, pp. 20–25, *Journal of Applied Physics*, vol. 16, No. 1.

Hansen, D.R., "Styrenic TPEs", 1989, pp. 116–117, *Modern Plastics Encyclopedia*.

Hashin, Z., "The Elastic Moduli of Heterogeneous Materials", 1962, pp. 143–150, *Journal of Applied Mechanics*, vol. 29, Series E, No. 1.

Hendewerk, M. and Spenadel, L., "New Speciality Linear Polymers (SLP) for Power Cables", Sep. 22–27, 1991, pp. 184–190, Proceedings of the 1991 IEEE Power Engineering Society Transmission and Distribution Conference, Dallas, Texas.

Huang, Y., et al., Chapter 1: "Mechanisms of Toughening Thermoset Resins", 1993, pp. 1–35, *Toughened Plastics I*, Advances in Chemistry Series 233, American Chemical Society, Washington, D.C.

Irwin, C., "Extrusion–blow molding", 1989, pp. 217–218, *Modern Plastics Encyclopedia*.

Jang, B.Z., Uhlmann, D.R., and Vander Sande, J.B., "Crazing in Polypropylene", Mid–Feb. 1985, *Polymer Engineering and Science.*, vol. 25, No. 2, pp. 98–104.

Jang, B.Z., Uhlmann, D.R., and Vander Sande, J.B., "Rubber–Toughening in Polypropylene", 1985, pp. 2485–2504, *Journal of Applied Polymer Science*, vol. 30.

Jang, B.Z., Uhlmann, D.R., and Vander Sande, J.B., "The Rubber Particle Size Dependence of Crazing in Polypropylene", 1985, pp. 643–651, *Polymer Engineering and Science*, vol. 25, No. 10.

Jeffries, Michael P., "The Marketing Challenge Created By Single Site Catalysts In Polyolefins", Sep. 24, 1991, pp. 43–55, Proceedings of the First International Business Forum on Specialty Polyolefins, Houston, Texas.

Karger–Kocsis, J., and Csikai, I., "Skin–Core Morphology and Failure of Injection–Molded Specimens of Impact–Modified Polypropylene Blends", Feb., 1987, pp. 241–253, *Polymer Engineering and Science*, vol. 27, No. 4.

Lovell, P.A., et al., Chapter 3: "Multiple–Phase Toughening–Particle Morphology", 1993, pp. 61–77, *Toughened Plastics I*, Advances in Chemistry Series 233, American Chemical Society, Washington, D.C.

Nishio, T., et al., "Development of Super Olefin Bumpers for Automobiles", Sep. 1992, pp. 12–22, *Toyota Technical Review*, vol. 42, No. 1.

Parker, H.R., "Introduction to injection molding", 1989, pp. 264–268, *Modern Plastics Encyclopedia*.

Pearson, Raymond A., Chapter 17: "Toughening Epoxies Using Rigid Thermoplastic Particles", 1993, pp. 406–425, *Toughened Plastics I*, Advances in Chemistry Series 233, American Chemical Society, Washington, D.C.

Pukanszky, B., et al., "Particle break–up and coalescence in heterogeneous PP/EPDM blends; effect of particle size on some mechianical properties", 1991, pp. 31–38, *Plastics, Rubber and Composites Processing and Applications*, vol. 15, No. 1.

Rader, C.P., "Elastomeric alloy TPEs", 1989, p. 112, *Modern Plastics Encyclopedia*.

Ramos, M. A. and Matheu, J.P.V., Influence of Talc's Morphological Characteristics on the Toughness of a Composite Based on Low–Density Polyethylene and Polyproopylene Blends, Apr. 1988, pp. 105–111, *Polymer Composites*, vol. 9, No. 2.

Riccò, T., et al., "Micromechanical Analysis of a Model for Particulate Composite Materials with Composite Particles—Survey of Craze Initiation", 1978, pp. 774–780, *Polymer Engineering and Science*, vol. 18, No. 10.

Rifi, M.R., et al., "Flexomer™ Polyolefins: A Bridge Between Polyethylene and Rubbers", Spring 1990, pp. 1–17, Paper No. 7, Union Carbide Chemical and Plastics Company Inc., Bound Brook, New Jersey.

Schubert, Lawrence H., "PP impact copolymers", 1989, pp. 88–90, *Modern Plastics Encyclopedia*.

Scobbo, J.J., Jr., "Characterization of Filled Elastomers by Dynamic Strain Amplification at High Frequencies", 1990, pp. 405–420, *Polymer Testing*, vol. 9.

Segall, I., et al., "Core–Shell Structured Latex Particles. III. Structure–Properties Relationship in Toughening of Polycarbonate with Poly(n–butyl acrylate)/Poly(benzyl methacrylate–styrene) Structured Latex Particles", 1995, pp. 419–425, *Journal of Applied Polymer Science*, vol. 58, No. 2.

Seymour, Raymond, B., Chapter 1: "Origin and Early Development of Rubber–Toughened Plastics", 1989, pp. 3–13, *Rubber–Toughened Plastics*, Advances in Chemistry Series 222, American Chemical Society, Washington, D.C.

Shedd, Charles D., "Introduction to TPEs", 1989, pp. 110–112, *Modern Plastics Encyclopedia*.

Sheridan, T.W., "Engineering TPEs", 1989, pp. 112–113, *Modern Plastics Encyclopedia*.

Speed, C.S., et al., "Structure/Property Relationships in EXXPOL™ Polymers", Feb. 24–27, 1991, Handout for Presentation at Polyolefins VII International Conference, Houston, Texas.

Speri, W.M., and Patrick, G.R., "Fiber Reinforced Rubber Modified Polypropylene", 1975, pp. 668–672, *Polymer Engineering and Science*, Vo. 15, No. 9.

Suspene, Laurent, et al., Chapter 7: "Additive Effects on the Toughening of Unsaturated Polyester Resins", 1993, pp. 163–188, *Toughened Plastics I*, Advanced in Chemistry Series 233, American Chemical Society, Washington, D.C.

Van der Sanden, D., and Halle, R.W., "A new family of linear ethylene polymers provides enhanced sealing performance", Feb. 1992, pp. 99–103, *Tappi Journal*.

van der Ven, Ser, Chapter 6, "Characterizations of In–Situ Made Toughened Polypropylenes", Elsevier 1990, pp. 289–334, *Polypropylene and other Polyolefins: Polymerization and Characterization*.

van der Ven, Ser, Chapter 14, "Future Trends in Catalysts, Process and Products", pp. 603–607, Elsevier 1990, *Polypropylene and other Polyolefins: Polymerization and Characterization*.

Varga, J., "Filler Dispersion in Polypropylene/Elastomer Blends", 1991, pp. 231–151, *Journal of Polymer Engineering*, vol. 1, Nos. 1–3.

Verchère, Didier, et al., Chapter 14: "Rubber–Modified Expoxies", 1993, pp. 335,363, *Toughened Plastics I*, Advances in Chemistry Series 233, American Chemical Society, Washington, D.C.

Williams, R.J.J., et al., Chapter 13: "A Model for Phase Separation During a Thermoset Polymerization", 1984, pp. 195–213, *Rubber–Modified Thermoset Resins*, Advances in Chemistry Series 208, American Chemical Society, Washington, D.C.

Wu, S., "A Generalized Criterion For Rubber Toughening: The Critical Matrix Ligament Thickness", 1988, pp. 549–561, *Journal of Applied Polymer Science*, vol. 35.

Amoco Chemicals Co., "Polypropylene—Introduction to polypropylene", 1989, p. 86, *Modern Plastics Encyclopedia*.

Exxon Chemical Company, Polymers Group, *Vistalon® Ethylene–Propylene Rubber User's Guide*, pp. 1–1, 1–2, 2–1, 2–2, 2–3, 10–1, 10–2, 10–10, 10–12, 10–13 and 10–14 (1988).

"Ethylene Polymers", 1967, pp. 359–386, *Encyclopedia of Polymer Science and Technology*, vol. 6.

"Emulsion Polymerization to Fibers, Manufacture", 1986, pp. 522–525; 562, *Encyclopedia of Polymer Science and Engineering*, vol. 6.

IMPACT-MODIFIED THERMOPLASTIC POLYOLEFINS AND ARTICLES FABRICATED THEREFROM

BACKGROUND OF THE INVENTION

1. Field of the Invention

This invention relates to thermoplastic polymers having improved impact modification, processes for making such polymers, and products made from such polymers.

2. Description of the Related Art

Thermoplastic olefins (TPOs) are generally produced from blends of an elastomeric material such as ethylenelpropylene rubber (EPM) or ethylene/propylene diene monomer terpolymer (EPDM) and a more rigid material such as isotactic polypropylene. Other materials or components can be added into the formulation depending upon the application, including oil, fillers, and cross-linking agents. Generally, TPOs are characterized by a balance of stiffness (modulus) and low temperature impact, good chemical resistance and broad use temperatures. Because of features such as these, TPOs are used in many applications, including automotive facia and wire and cable operations.

It is well known that narrow molecular weight distribution linear polymers disadvantageously have low shear sensitivity or low $I_{10}/I_2$ value, which limits the extrudability of such polymers. Additionally, such polymers possess low melt elasticity, causing problems in melt fabrication such as film forming processes or blow molding processes (e.g., sustaining a bubble in the blown film process, or sag in the blow molding process etc.). Finally, such resins also experienced surface melt fracture properties at relatively low extrusion rates thereby processing unacceptably and causing surface irregularities in the finished product.

While the development of new lower modulus polymers such as Flexomer™ polyolefins by Union Carbide or Exact™ polymers by Exxon has aided the TPO marketplace, there continues to be a need for other more advanced, cost-effective polymers for compounding into polypropylene which improve or maintain low temperature impact performance, elongation to break, modulus, tensile strength and weld line strength. These and other needs are met by the present invention.

SUMMARY OF THE INVENTION

According to one aspect of this invention, a melt processible thermoplastic composition is described comprising:

(a) a thermoplastic polymer resin matrix selected from the group consisting of thermoplastic polyurethanes, polyvinyl chlorides, styrenics, engineering thermoplastics, and polyolefins, (b) at least about 25 percent (by weight based on the total composition) of an elastomeric impact modifier dispersed as discrete particles in the thermoplastic matrix (a); and (c) at least about 10 percent (by weight based on the total composition) of at least one homogeneous linear or substantially linear ethylene polymer dispersed as discrete particles in at least the impact modifier (b), the ethylene polymer having a molecular weight distribution less than 3.5 and density at least 0.04 g/cm³ higher than the density of the impact modifier component(b), wherein the elastic modulus of the thermoplastic component (a) is at least 200 times greater than the elastic modulus of the impact modifier component (b).

According to another aspect of this invention, a process for making a thermoplastic olefinic polymer composition is described comprising mixing at an elevated temperature:

(a) a thermoplastic polymer resin matrix selected from the group consisting of thermoplastic polyurethanes, polyvinyl chlorides, styrenics, engineering thermoplastics, and polyolefins, (b) at least about 25 percent (by weight based on the total composition) of an elastomeric impact modifier; and (c) at least about 10 percent (by weight based on the total composition) of at least one homogeneous linear or substantially linear ethylene polymer, the ethylene polymer having a molecular weight distribution less than 3.5 and a density at least 0.04 g/cm³ higher than the density of the impact modifier component(b), wherein the elastic modulus of the thermoplastic component (a) is at least 200 times greater than the elastic modulus of the impact modifier component (b).

The present invention also includes articles comprising at least one of the melt processible compositions of this invention, and the shaping of these articles, preferably in a melt processing operation.

DETAILED DESCRIPTION OF THE INVENTION

1. General Definitions

"Polymer" means a large molecule made from a number of repeating units termed monomers. "Homopolymer" means a polymer made from one kind of monomer. "Interpolymer" means a polymer made from two or more kinds of monomers, and includes "copolymers" which are made from two kinds of monomers, "terpolymers" which are made from three kinds of monomers, and the like.

2. Thermoplastic Polymer Matrix

The thermoplastic polymer used in the practice of this invention is any polymer which may be remelted after it has previously been melt processed and extruded into a shaped article. It may be substantially crystalline, for example, polypropylene or HDPE, or substantially noncrystalline, such as the elastomeric polymers described above. The thermoplastic polymer is preferably substantially crystalline.

The expression "substantially crystalline" means that the polymer has at least 25% crystallinity. More preferably, the thermoplastic polymer has at least 50% crystallinity and even more preferably the thermoplastic polymer has at least 75% crystallinity.

The thermoplastic polymers which are beneficially impact modified can be thermoplastic polyurethanes (e.g., Pellathane™ or Isoplast™ made by The Dow Chemical Company), polyvinyl chlorides (PVCs), styrenics, polyolefins (including, e.g., ethylene carbon monoxide copolymers (ECO) or linear alternating ECO copolymers such as those disclosed by U.S. Ser. No. 08/009,198, filed Jan. 22, 1993 in the names of John G. Hefner and Brian W. S. Kolthammer, entitled "Improved Catalysts For The Preparation of Linear Carbon Monoxide/Alpha Olefin Copolymers," the disclosure of which is incorporated herein by reference, and ethylene/propylene carbon monoxide polymers (EPCO)), various engineering thermoplastics (e.g., polycarbonate, thermoplastic polyester, polyamides (e.g., nylon), polyacetals, or polysulfones). Generally the polyolefin polymers which are most frequently used are polyethylene (e.g., high density polyethylene, such as that produced by the slurry polymerization process, heterogeneously branched linear low density polyethylene (LLDPE) such as copolymers of ethylene with at least one $C_3$–$C_{20}$ α-olefin, and recycled polyethylene (e.g., post consumer recycled high density polyethylene recovered from waste bottles)) or polypropylene. Generally at least one polypropylene is more frequently useful in the compositions disclosed herein.

The polypropylene is generally in the isotactic form of homopolymer polypropylene, although other forms of polypropylene can also be used (e.g., syndiotactic or atactic). Polypropylene impact copolymers (e.g., those wherein a secondary copolymerization step reacting ethylene with the propylene is employed) and random copolymers (also reactor modified and usually containing 1.5–7 percent ethylene copolymerized with the propylene), however, can also be used in the TPO formulations disclosed herein. A complete discussion of various polypropylene polymers is contained in *Modern Plastics Encyclopedia*/89, mid October 1988 Issue, Volume 65, Number 11, pp. 86–92, the entire disclosure of which is incorporated herein by reference. The molecular weight of the polypropylene for use in the present invention is conveniently indicated using a melt flow measurement according to ASTM D-1238, Condition 230° C./2.16 kg (formerly known as "Condition (L)" and also known as $l_2$). Melt flow rate is inversely proportional to the molecular weight of the polymer. Thus, the higher the molecular weight, the lower the melt flow rate, although the relationship is not linear. The melt flow rate for the polypropylene useful herein is generally from about 0.1 grams/10 minutes (g/10 min) to about 100 g/10 min. For impact modification of automotive facia, the melt flow rate for the polypropylene is generally from about 0.1 g/10 min to about 35 g/10 min, preferably from about 0.5 g/10 min to about 25 g/10 min, and especially from about 1 g/10 min to about 20 g/10 min. For thin walled containers (such as cups and lids made, for example, using an injection molding process), the melt flow rate for the polypropylene is generally from about 20 g/10 min to about 100 g/10 min.

High molecular weight thermoplastic polymers may be used to produce stronger compositions. The number average ($M_n$) molecular weight is from about 7,000 to about 1,000,000 or more, preferably from about 10,000 to about 500,000.

The tensile modulus of the thermoplastic component is at least 200, preferably at least 1000, times greater than the tensile modulus of the elastomeric impact modifier. Tensile modulus herein is measured according to ASTM-D-638.

3. Elastomeric Impact Modifier

"Elastomeric impact modifier" means a polymer that can be stretched with the application of stress to at least twice its length and after release of the stress, returns to its approximate original dimensions and shape. The elastic recovery of an elastomeric impact modifier is generally at least 40%, preferably at least 60%, and more preferably at least 80% when measured according to ASTM D-412. This component is also referred to hereafter as the "impact modifier" or "elastomeric polymer".

Suitable elastomeric polymers for use in this invention include ethylene/α-olefin interpolymers; isoprene rubbers such as polyisoprene (including natural rubber) and isobutylene/isoprene rubber (butyl rubber); polychloroprene; butadiene rubbers such as polybutadiene, styrene/butadiene rubber, and acrylonitrile/butadiene rubber; and block copolymer rubbers such as styrene/isoprene/styrene triblock, styrene/butadiene/styrene triblock, and hydrogenated styrene/butadiene/styrene block, e.g. styrene/ethylene/-butene/styrene block copolymer. The term "α-olefin" means a hydrocarbon molecule or a substituted hydrocarbon molecule (i.e. a hydrocarbon molecule comprising one or more atoms other than hydrogen and carbon, e.g. halogen, oxygen, nitrogen, etc.), the hydrocarbon molecule comprising (i) only one ethylenic unstaturation, this unsaturation located between the first and second carbon atoms, and (ii) at least 3 carbon atoms, preferably of 3 to 20 carbon atoms, in some cases preferably of 4 to 10 carbon atoms and in other cases preferably of 4 to 8 carbon atoms. Examples of preferred α-olefins from which the elastomers used in this invention are prepared include propylene, 1-butene, 1-pentene, 4-methyl-1-pentene, 1-pentene, 1-hexene, 1-octene, 1-decene, 1-dodecene, and mixtures of two or more of these monomers.

Preferred among the elastomeric polymers useful in the practice of this invention are the ethylene/α-olefin interpolymers, particularly those having a density less than about 0.870 g/cm$^3$, such as those having a density in the range from 0.855 to 0.870 g/cm$^3$. Also preferred are elastomeric polymers having a melt index ($l_2$) less than 5, more preferably less than 3, g/10 min. Preferred ethylene interpolymers include ethylene/α-olefin copolymers; ethylene/α-olefin/diene terpolymers; and interpolymers of ethylene and one or more other monomers which are copolymerizable with ethylene, such as ethylenically unsaturated carboxylic acids (both mono-and difunctional) and their corresponding esters and anhydrides, e.g., acrylic acid, methacrylic acid, vinyl ester (e.g., vinyl acetate) and maleic anhydride, and vinyl group-containing aromatic monomers such as styrene. Preferred α-olefins are derived from 1-octene, 1-hexene, 1-pentene, 4-methyl-1-pentene, 1-butene and propylene.

Included among these polymers are (i) heterogeneous linear low density ethylene interpolymers (heterogeneous LLDPE) made using Ziegler-Natta catalysts in a slurry, gas phase, solution or high pressure process, such as described in U.S. Pat. No. 4,076,698; (ii) homogeneous linear ethylene polymers such as (a) those described in U.S. Pat. No. 3,645,992; (b) those made using the so-called single site catalysts in a batch reactor having relatively high olefin concentrations as described, for example, in U.S. Pat. Nos. 5,026,798 and 5,055,438; and (iii) homogeneous substantially linear olefin polymers having long chain branching as described, for example, in U.S. Pat. Nos. 5,272,236 and 5,278,272. Such polymers are commercially available. Representative of commercially available homogeneous linear ethylene polymers are TAFMER™ made by Mitsui Petrochemical Industries, Ltd. and EXACT™ made by Exxon Chemical Co. The substantially linear ethylene polymers are more fully discussed later. Each of the U.S. patents cited in this paragraph are incorporated herein by reference.

Ethylene/α-olefin/diene terpolymers may be used as the elastomeric impact modifier. Suitable α-olefins include the α-olefins described above as suitable for making ethylene/α-olefin copolymers. The dienes suitable as monomers for preparation of such terpolymers are either conjugated or nonconjugated. They are typically nonconjugated dienes having from 6 to 15 carbon atoms. Representative examples of suitable nonconjugated dienes that may be used to prepare the terpolymer include:

a) Straight chain acyclic dienes such as 1,4-hexadiene, 1,5-heptadiene, piperylene (piperylene is conjugated), and 1,6-octadiene;

b) branched chain acyclic dienes such as 5-methyl-1,4-hexadiene, 3,7-dimethyl-1,6-octadiene, and 3,7-dimethyl-1,7-octadiene;

c) single ring alicyclic dienes such as 4-vinylcyclohexene, 1-allyl-4-isopropylidene cyclohexane, 3-allylcyclopentene, 4-allylcyclohexene, and 1-isopropenyl4-butenylcyclohexane;

d) multi-ring alicyclic fused and bridged ring dienes such as dicyclopentadiene; alkenyl, alkylidene, cycloalkenyl and cycloalkylidene norbornenes such as 5-methylene-2-norbornene, 5-methylene-6-methyl-2-norbornene, 5-methylene-6,6-dimethyl-2-norbornene, 5-propenyl-2-norbornene, 5-(3-cyclopentenyl)-2-norbornene, 5-ethylidene-2-norbornene, and 5-cyclohexylidene-2-norbornene; and the like.

The preferred dienes are selected from the group consisting of 1,4-hexadiene, dicyclopentadiene, 5-ethylidene-2-norbornene, 5-methylene-2-norbornene, 7-methyl-1,6-octadiene, piperylene; 4-vinylcyclohexene, etc.

The preferred terpolymers for the practice of the invention are terpolymers of ethylene, propylene and a nonconjugated diene (EPDM). Such terpolymers are available commercially, such as NORDEL™ made by Du Pont Company and are or will be commercially available from such companies as DuPont Dow Elastomers L.L.C.

The total diene monomer content in the terpolymer may suitably range from about 0.1 to about 15 wt %, preferably 0.5 to about 12 wt %, and most preferably about 1.0 to about 6.0 wt %.

Both the ethylene copolymers and the ethylene terpolymers comprise from about 20 to about 90 wt %, preferably from about 30 to about 85 wt %, ethylene with the other comonomers comprising the balance. The ethylene copolymers and terpolymers preferably have a weight average molecular weight ($M_w$) of at least about 10,000, and more preferably at least about 15,000, and may have a $M_w$ of up to about 1,000,000 or higher, preferably up to about 500,000.

The elastomeric polymer preferably has a Mooney viscosity of at least 20. Mooney viscosity is defined herein as measured at 100° C. according to ASTM D-1646.

The elastomeric polymer is preferably substantially amorphous. The expression "substantially amorphous" means that the polymer has a degree of crystallinity less than about 25%. The elastomeric polymer more preferably has a crystallinity of less than about 15%.

The elastomeric polymer may be the product of a single polymerization reaction or may be a polymer blend resulting from physical blending of polymers obtained from different polymerization reactions and/or resulting from using a mixed polymerization catalyst.

"Functionalized elastomeric polymer" means an elastomeric polymer or elastomeric polymer blend that comprises at least one reactive substituent that will react with the reactive substituents of the crosslinking agent to at least partially vulcanize the elastomer. Preferred reactive elastomer substituents are selected from the group consisting of carboxylic acid, carboxylic anhydride, carboxylic acid salt, carbonyl halide, hydroxy, epoxy, and isocyanate.

Preferred ethylene/α-olefin interpolymers are ethylene/1-dodecene, ethylene/1-decene, ethylene/1-octene, ethylene/1-hexene, ethylene/4-methyl-1-pentene, ethylene/1-pentene, ethylene/1-butene and ethylene/propylene copolymers produced via a constrained geometry single site catalyst. A process for making such copolymers is described in U.S. Pat. Nos. 5,272,236 and 5,278,272, both of which are incorporated by reference. Such ethylene interpolymers are preferably substantially linear olefin polymers having long chain branching. Substantially linear olefin polymers can be made by gas phase, solution phase, high pressure or slurry polymerization. These polymers are preferably made by solution polymerization. Substantially linear ethylene polymers (SLEP's) are commercially available from The Dow Chemical Co. under the trademark AFFINITY and from DuPont Dow Elastomers L.L.C. under the trademark ENGAGE.

"Substantially linear polymer" means that the polymer backbone contains long chain branching and is substituted with an average of up to three long chain branches/1000 carbons. Preferred substantially linear polymers are substituted with about 0.01 to about 3 long chain branches/1000 carbons, more preferably from about 0.01 to about 1 long chain branches/1000 carbons, and especially from about 0.3 to about 1 long chain branches/1000 carbons. These substantially linear polymers are characterized by:

a) a melt flow ratio, $l_{10}/l_2, \geq 5.63$, b) a molecular weight distribution, $M_w/M_n$, defined by the equation:

$$M_w/M_n \leq (l_{10}/l_2) - 4.63, \text{ and}$$

c) a critical shear stress at onset of gross melt fracture of greater than $4 \times 10^6$ dyne/cm$^2$.

"Long chain branching" means a pendant carbon chain having a chain length of at least 6 carbons, above which the length cannot be distinguished using $^{13}$C nuclear magnetic resonance spectroscopy. The long chain branch can be as long as about the length of the polymer backbone to which it is attached.

The presence of long chain branching can be determined in ethylene homopolymers by using $^{13}$C nuclear magnetic resonance (NMR) spectroscopy and is quantified using the method of Randall (*Rev. Macromol. Chem. Phys.*, C29 (2&3), p. 285–297). However as a practical matter, current $^{13}$C nuclear magnetic resonance spectroscopy cannot determine the length of a long chain branch in excess of six carbon atoms. For ethylene α-olefin copolymers, the long chain branch is longer than the short chain branch that results from the incorporation of the α-olefin(s) into the polymer backbone. For example, a substantially linear ethylene/1-octene copolymer has a short chain branch length of six (6) carbons, but a long chain branch length of at least seven (7) carbons.

The SLEP's preferably comprise from about 95 to 50 wt % ethylene, and from about 5 to 50 wt % of at least one α-olefin comonomer, more preferably from 10 to 35 wt % of at least one α-olefin comonomer. The comonomer content is measured using infrared spectroscopy according to ASTM D-2238, Method B. Typically, the SLEP's are copolymers of ethylene and an α-olefin of 3 to about 20 carbon atoms (e.g., propylene, 1-butanene, 1-hexene, 4-methyl-1-pentene, 1-heptene, 1-octene, styrene, etc.), preferably of 3 to about 10 carbon atoms, and more preferably these polymers are a copolymer of ethylene and 1-octene. The density of these substantially linear ethylene polymers is preferably in the range from about 0.85 to about 0.9, more preferably from about 0.85 to about 0.88, grams per cubic centimeter (g/cm$^3$) determined by ASTM D-792. The melt flow ratio, measured as $l_{10}/l_2$ as defined in ASTM D-1238, Conditions 190C/10 kg and 190C/2.16 kg (formerly known as "Conditions (N) and (E)", respectively and also known as $l_{10}$ and $l_2$, respectively), is greater than or equal to 5.63, and is preferably in the range from about 6.5 to 15, more preferably in the range from about 7 to 10. The molecular weight distribution ($M_w/M_n$), measured by gel permeation chromatography (GPC), is preferably in the range from about 1.5 to 2.5. For substantially linear ethylene polymers, the $l_{10}/l_2$ ratio indicates the degree of long-chain branching, i.e. the larger the $l_{10}/l_2$ ratio, the more long-chain branching in the polymer.

A unique characteristic of the homogeneously branched, substantially linear ethylene polymers is the highly unexpected flow property where the $l_{10}/l_2$ value of the polymer is essentially independent of the polydispersity index (i.e., $M_w/M_n$) of the polymer. This is contrasted with conventional linear homogeneously branched and linear heterogeneously branched polyethylene resins having rheological properties such that to increase the $I_{10}/I_2$ value the polydispersity index must also be increased.

Substantially linear olefin polymers have a critical shear rate at onset of surface melt fracture of at least 50 percent greater than the critical shear rate at the onset of surface melt fracture of a linear olefin polymer having about the same $I_2$, $M_w/M_n$, and density. By "about the same" is meant that each value is within 10 percent of the comparative value.

The preferred melt index, measured as $I_2$(ASTM D-1238, condition 190/2.16 (formerly condition E)), is from about 0.5 g/10 min to 200 g/10 min, more preferably 1 to 20 g/10 min. Typically, the preferred SLEP's used in the practice of this invention are homogeneously branched and do not have any measurable high density fraction, i.e., short chain branching distribution as measured by Temperature Rising Elution Fractionation described in U.S. Pat. No. 5,089,321, which is incorporated herein by reference. Stated in another manner, these polymers do not contain any polymer fraction that has a degree of branching less than or equal to 2 methyl groups/1000 carbons. These preferred SLEP's also have a single differential scanning calorimetry (DSC) melting peak .between −30C. and 150C. using a second heat at a scanning rate of 10 C./minute.

4. Homogeneous Linear or Substantially Linear Ethylene Polymer

The third component of the thermoplastic olefinic polymer composition according to this invention is a homogeneous linear or substantially linear ethylene polymer having a molecular weight distribution less than 3.5, preferably in the range from 1.8 to 2.5. The molecular weight distribution is the weight average molecular weight of the polymer divided by the number average molecular weight of the polymer ($M_w/M_n$) measured by gel permeation chromatography (GPC).

The density of this component is at least 0.04, preferably at least 0.05 and more preferably at least 0.06, g/cm$^3$ higher than the density of the elastomeric impact modifier component determined according to ASTM D-792. In a preferred embodiment of this invention, the density of this component is in the range from about 0.90 to about 0.95 g/cm$^3$.

The homogeneous linear ethylene polymer may be selected from among (a) those described in U.S. Pat. No. 3,645,992 and (b) those made using single site catalysts in a batch reactor having relatively high olefin concentrations as described, for example, in U.S. Pat. Nos. 5,026,798 and 5,055,438. Such polymers are commercially available. Representative examples are TAFMER™ made by Mitsui Petrochemical Industries, Ltd., and EXCEED™ by Exxon Chemical Co.

The homogeneous substantially linear ethylene polymer (SLEPs) may be selected from among those described above as elastomeric impact modifiers with the caveat that they must be selected to comply with the molecular weight distribution an density ranges required for this component.

5. Additives and Adjuvants

Many different adjuvants or additives are known to modify polymer costs and/or properties. These may optionally be used in the present invention. Nonlimiting examples include fillers such as $TiO_2$ or carbon black; extender oils, including aliphatic or napthenic or polyester oils; processing aids such as stearic acid; phenolic, thioester and phosphite antioxidants such as Irganox 1010ä (commercially available from Ciba-Geigy) or Weston 619ä (commercially available from General Electric); acid neutralizers such as MgO, calcium stearate, dihydrotalcite, tin mercaptans, and tetrasodium prophosphate; and pigments. If the composition contains a crosslinking agent for vulcanization, adjuvants may be added before or after the dynamic vulcanization. Depending on the nature of the adjuvant and its interaction with the selected crosslinking chemistry, preferably the adjuvant may be added after dynamic vulcanization has occurred.

Although fillers and compounding ingredients are not essential components of the thermoplastic composition of this invention, preferably, especially from a cost standpoint, various amounts of conventional fillers and/or compounding ingredients normally used with elastomers are admixed with the compositions of this invention. Examples of such ingredients include extending oils, e.g., aromatic oils, paraffinic oils or naphthenic oils; inorganic fillers, such as various carbon blacks, clays, silica, alumina, calcium carbonate; pigments, such as titanium dioxide; antioxidants; antidegradants; processing aids such as lubricants and waxes; and plasticizers such as dialkylphthalates, trialkylmellitates and dialkyladipates. An example of a preferred filler is talc, such as VANTALC™ supplied by R. T. Vanderbilt and made by Luzinac. Preferably, the processing oils and/or plasticizers and inorganic fillers are added to the thermoplastic composition to improve its processing characteristics and the particular amounts used depend, at least in part, upon the quantities of other ingredients in the composition and the desired properties of the composition.

6. Formulation and Applications

The thermoplastic compositions according to this invention comprise at least about 25, preferably up to 36, wt % of the elastomeric impact modifier coponent and at least about 10, preferably up to about 20 wt % of the ethylene polymer component. The weight ratio of the impact modifier component to ethylene polymer component is preferably at least 2:1 and preferably up to 4:1. Generally, amounts from about 5 to 50 parts by weight fillers based on 100 parts by weight total polymers can be used and 10 to 100 parts by weight compounding ingredients such as processing oils and plasticizers based on 100 parts by weight total weight of polymers can be used. In a preferred embodiment, the thermoplastic composition contains from 10 to 20 wt % filler and optionally from 20 to 40 wt % compounding ingredients.

The compositions according to this invention may also contain minor amounts (i.e., less than 50 wt %, preferably less than 10 wt %) of one or more polymers other than the above-described polymer components 1 to 3, and each of polymer components 1 to 3 may independently comprise mixtures.

The balance of the thermoplastic composition of this invention is the thermoplastic resin component. The thermoplastic resin component preferably comprises at least about 30, more preferably at least about 40, wt % of the composition.

The formulations are compounded by any convenient method, including dry blending the individual components and subsequently melt mixing, either directly in the extruder used to make the finished article (e.g., the automotive part) or by pre-melt mixing in a separate extruder (e.g., a Banbury mixer). These TPOs can be processed using conventional plastic processing equipment.

There are many types of molding operations which can be used to form useful fabricated articles or parts from the TPO formulations disclosed herein, including various injection molding processes (e.g., that described in *Modern Plastics Encyclopedia*/89, Mid October 1988 Issue, Volume 65, Number 11, pp. 264–268, "Introduction to Injection Molding" and on pp. 270–271, "Injection Molding Thermoplastics", the disclosures of which are incorporated herein by reference) and blow molding processes (e.g., that described in *Modern Plastics Encyclopedia*/89, Mid October 1988 Issue, Volume 65, Number 11, pp. 217–218, "Extrusion-Blow Molding", the disclosure of which is incorporated herein by reference) and profile extrusion. Some of the fabricated articles include automotive bumpers, facia, wheel covers and grills, as well as other household and personal articles, including, for example, refrigerator and freezer components, and freezer containers.

Freezer containers made with the thermoplastic compositions discosed herein have a unique combination of desired attributes, including good impact at low temperatures (to prevent cracking the container if dropped) and good clarity with which to see the food.

Good clarity is achieved by selecting as the elastomeric impact modifier and as the ethylene polymer third component linear or substantially linear ethylene/α-olefin polymers which have a refractive index within 0.005 refractive index units from the refractive index of the thermoplastic to be modified, especially within 0.002 refractive index units typically measured at 589 nm. Generally, polypropylene has a refractive index from about 1.470 to about 1.515, e.g., clarified polypropylene homopolymer has a refractive index of about 1.5065 and clarified polypropylene random copolymer has a refractive index of about 1.5044 at 589 nm.

7. Additional Advantages and Properties

The thermoplastic compositions of this invention have important advantages in being able to achieve certain properties, particularly certain properties in combination.

For example, there has been difficulty in achieving a high percent elongation to break of thermoplastic compositions while at the same time achieving sufficient impact strength, especially low temperature impact strength. When the density of the impact modifier is increased to improve impact strength, the inventors observed that the percent elongation to break suffered and vice versa.

The present invention overcomes this no win situation. A preferred embodiment has an elongation to break of at least 50 percent and a notched Izod impact strength at −30°C. of at least 20 foot-pounds/inch². A more preferred embodiment has an elongation to break of at least 70 percent for the same notched Izod impact strength or higher. Another preferred embodiment has a notched Izod impact strength at −30°C. of at least 26 foot-pounds/inch² for the same or higher percent elongation to break. In a preferred embodiment, these values are measured based on a thermoplastic composition containing 15 wt % VANTALC 6H filler.

The percent elongation to break is defined herein to be the value measured according to ASTM D-638 at a deformation rate of 20 inches/minute and at ambient temperature using an injection molded sample of the thermoplastic composition. The tensile test is carried out in an INSTRON machine. The test is under displacement control. The injection molding procedure and conditions are described below.

The notched Izod impact strength at −30° C. is defined herein to be the value measured according to ASTM D-256 at −30° C. using a single end gated bar of injection molded sample of the thermoplastic composition. The notched Izod impact test on single end gated bars (0.5×5.0×0.125 inch) uses a milled notch and conforms with ASTM D-256. The injected bars are notched in the center of the bar by a notcher with notch depth 0.400 "±0.002". The Izod impact testing uses a standard unit equipped with cold temperature chamber and a 2 ft-lb, free falling hammer. The injection molding procedure and conditions are described below.

Compositions of the present invention preferably have tensile modulus values within at least 10%, preferably within 5%, of the tensile modulus of the thermoplastic resin component. Preferably, the compositions of the invention have tensile modulus values of at least about 1200 Mpa. The tensile modulus is measured according to ASTM D-638.

Another advantage of this invention is the ability to achieve a high weld strength, especially in combination with the above properties. In a preferred embodiment, the weld line strength is at least 1700, more preferably at least 1800, pounds per square inch (psi). The weld line strength values are measured according to ASTM-638 using a sample of the thermoplastic composition injection molded into the shape of a double end gated bar instead of a single end gated bar. The injection molding procedure and conditions are described below.

The injection molding procedure and conditions for testing these and other properties of the thermoplastic compositions are as follows. The thermoplastic compositions are prepared for injection molding using a Farrell Banbury BR type mixer having a 1575 cc capacity. A total of 1100 grams is used for each formulation. The entire formulation amount is added to a warm Banbury mixer with the rotor speed at 200 rpm until the material begins to flux (approximately 1 min.), at which time the rotor speed is subsequently slowed to 175 (or whatever rotor speed is required to maintain a melt temperature below 180° C.) and mixing continues for 3 minutes past flux. The mixed formulation then is discharged from the mixer and passes through a cold roll mill to make a sheet. The sheet is ground into flake and the flake is subsequently injection molded into test specimens using an "ASTM family mold". A 70 ton Arburg injection molding unit is used with the following basic settings: a 190°/210°/210°/210° C. temperature profile, a 74° F. mold temperature, a 300 psi injection pressure for 1.8 seconds, a 250 psi hold pressure for 15 seconds, and a 30 second cooling time. The injection molding conditions are listed in Table 1 below. The impact, strength, tensile modulus, and weld line strength test samples then are injection molded. All the tests are performed after waiting at least 24 hours after injection to allow the samples to reach equilibrium.

TABLE 1

| Injection molding conditions for 70 ton machine | | | | | |
|---|---|---|---|---|---|
| SCREW RPM | Inject. Press (bar) | Hold Press (bar) | Back Press (bar) | Barrel Temp (°C.) | Mold Temp. (°C.) |
| 180 | 20 | 23 | 8 | 245 | 77 |
| Dosage | Injection (sec.) | Freed Temp. (°C.) | Zone 2 Temp. (°C.) | Zone 3 Temp. (°C.) | Die Temp. (°C.) |
| 10.4 | 2 | 190 | 210 | 210 | 210 |

The thermoplastic compositions of this invention have a morphology which may be described as a multi-phase composition having at least three phases in which discrete particles of the homogeneous linear or substantially linear ethylene polymer component are dispersed at least in the elastomeric impact modifier component, which in turn is dispersed within the thermoplastic polymer matrix as discrete particles. In a preferred embodiment, a major amount (i.e., more than 50 wt %, preferably at least 90 wt %) of the ethylene polymer component is dispersed as discrete particles within the elastomeric impact modifier phase. The number average particle size of the elastomeric impact modifier particles, inclusive of the ethylene polymer particles within, is preferably less than or equal to 2 microns, more preferably less than or equal to 1 micron. The polydispersity index of the elastomeric impact modifier particle size is preferably less than 3 and more preferably less than 1. The total volume occupied by the ethylene polymer particles within the elastomeric impact modifier particles is preferably less than 90 percent of the total volume of the elastomeric impact modifier particles inclusive of the ethylene polymer particles within.

The following examples are presented as illustrative of the present invention. The present invention should not be considered in any way limited by these examples. Unless otherwise specified, all parts, percentages, and ratios are by weight.

EXAMPLES

Thermoplastic compositions are prepared for testing using the above-described procedure and conditions for injection molding test specimens using an "ASTM family mold". Each thermoplastic composition formulation contains HIMONT PRO-FAX™ PD-701 (an isotactic polypropylene homopolymer having a melt flow rate ($I_2$) of 35 g/10 min., a density of 0.9 g/cm$^3$ and a tensile strength at yield of 4,500 psi (31 Mpa) available from Himont USA, Inc.), NORDEL™ 2522 (an EPDM having a Mooney viscosity according to ASTM D-1646 at 100° C. of 46 0 when combined with 50 wt % FEF carbon black and 10 wt % SUNPAR™ 150 OIL (available from Sun Oil Co.) which is available from Du Pont Company) and talc (VANTALC™ (6-H)). To each of these formulations was added of a third phase specified in Table 2 below.

The formulations of some comparative examples and controls are also listed in Table 2. The Izod impact test results of the examples are listed in Table 3, tensile test results are shown in Table 4, and weld line strengths are shown in Table 5. Each result shown below is the average of values obtained by testing five samples.

TABLE 2

The formulation of examples

| Sample | Matrix | rubber phase | Filler | third phase |
|---|---|---|---|---|
| Example 1 | HIMONT PD-701 | NORDEL 2522 | VANTALC 6H | Dow Affinity plastomer 0.913 g/cc, 0.5 $I_2$, MWD = 2 |
| WT % Example 2 | 50 HIMONT PD-701 | 25 NORDEL 2522 | 15 VANTALC 6H | 10 Dow INSITE ™ technology homopolymer 0.952 g/cc, 0.5 $I_2$, MWD = 2 |
| WT % Example 3 | 50 HIMONT PD-701 | 25 NORDEL 2522 | 15 VANTALC 6H | 10 Dow Affinity plastomer 0.913 g/cc, 0.5 $I_2$, MWD = 2 |
| WT % Comparative Example 1 | 50 HIMONT PD-701 | 21.4 NORDEL 2522 | 15 VANTALC 6H | 8.6 Dow Attane LLDPE 0.913 g/cc, 0.5 $I_2$, MWD = 4.5 |
| WT % Comparative Example 2 | 50 HIMONT PD-701 | 25 NORDEL 2522 | 15 VANTALC 6H | 10 Dow Slurry HDPE 30052, 0.952 g/cc, 0.35 $I_2$, MWD > 4 |

TABLE 2-continued

The formulation of examples

| Sample | Matrix | rubber phase | Filler | third phase |
|---|---|---|---|---|
| WT % Comparative Example 3 | 50 HIMONT PD-701 | 25 NORDEL 2522 | 15 VANTALC 6H | 10 Dow Attane LLDPE 0.913 g/cc, 0.5 $I_2$, |
| WT % Control 1 | 55 HIMONT PD-701 | 21.4 NORDEL 2522 | 15 VANTALC 6H | 8.6 |
| WT % Control 2 | 60 HIMONT PD-701 | 25 NORDEL 2522 | 15 VANTALC 6H | 0 |
| WT % | 55 | 30 | 15 | 0 |

TABLE 3

Izod Impact Strength at -30° C.

|  | Example 1 | Example 2 | Comparative Example 1 | Comparative Example 2 | Control 1 |
|---|---|---|---|---|---|
| Average Izod impact strength (ft-lb/in$^2$) at -30° C. | 22.48 | 20.44 | 20.0 | 16.70 | 11.14 |
| Standard deviation | 0.41 | 0.22 | 0.9 | 1.04 | 3.37 |

TABLE 4

Tensile Properties at Room Temperature

|  | % Elongation at Yield | % Elongation at Break |
|---|---|---|
| Example 1 | 7.03 ± 0.6 | 84.7 ± 16 |
| Example 2 | 6.73 ± 0.17 | 51.3 ± 3.1 |
| Comparative Example 1 | 5.91 ± 0.5 | 55.9 ± 8.6 |
| Comparative Example 2 | 5.85 ± 0.2 | 47.95 ± 14.11 |
| Control 1 | 6.0 ± 0.1 | 82.8 ± 29.8 |

TABLE 5

Weld Line Strength

|  | Example 3 | Comparative Example 3 | Control 2 |
|---|---|---|---|
| Weld line strength (psi) | 1845 | 1645 | 1580 |
| Standard deviation | 76.6 | 176.8 | 184.5 |

Although the invention has been described in considerable detail through the preceding specific embodiments, it is to be understood that these embodiments are for purposes of illustration only. Many variations and modifications can be made by one skilled in the art without departing from the spirit and scope of the invention.

What is claimed is:

1. A thermoplastic olefinic polymer composition having at least three phases comprising:
   (a) a thermoplastic polymer resin matrix selected from the group consisting of thermoplastic polyurethanes, polyvinyl chlorides, styrenics, engineering thermoplastics, and polyolefins, (b) at least about 25 percent (by weight based on the total composition) of an elastomeric impact modifier dispersed as discrete particles in the thermoplastic matrix (a); and (c) at least about 10 percent (by weight based on the total composition) of at least one homogeneous linear or substantially linear ethylene polymer dispersed as discrete particles in at least the impact modifier (b), the ethylene polymer having a molecular weight distribution less than 3.5 and a density of at least 0.04 g/cm$^3$ higher than the density of the impact modifier component (b), wherein the tensile modulus of the thermoplastic component (a) is at least 200 times greater than the tensile modulus of the impact modifier component (b).

2. The composition of claim 1, wherein impact modifier (b) is an ethylene/α-olefin interpolymer having a density of less than about 0.87 g/cm$^3$.

3. The composition of claim 1, wherein impact modifier (b) is an ethylene/α-olefin/diene terpolymer.

4. The composition of claim 1 having an elongation at break of at least 50 percent (tested in accordance with ASTM D-638 at a deformation rate of 20 inches/minute and at ambient temperature) and a notched Izod impact strength tested at −30°C. in accordance with ASTM D-256 of at least 20 foot-pounds/inch$^2$.

5. The composition of claim 4 further characterized as having a tensile modulus within 10 percent of that of the thermoplastic matrix of component (a), as determined in accordance with ASTM D-638 at a strain rate of 20 inch/min. and ambient temperature.

6. The composition of claim 4 having a notched Izod impact strength tested at −30° C. in accordance with ASTM D-256 of at least 26 foot-pounds/inch$^2$ measured when the composition does not contain filler.

7. The composition of claim 4 containing from about 10 to about 20 percent (by weight based on the total composition) of at least one filler.

8. The composition according to claim 1, wherein a double end gated bar injection molded from said composition has a weld line strength, tested in accordance with ASTM D-638, of at least 1700 psi.

9. The composition according to claim 1, wherein the tensile modulus of the thermoplastic component (a) is at least 1000 times greater than the tensile modulus of the impact modifier component (b).

10. The composition according to claim 1, wherein the thermoplastic is isotactic polypropylene.

11. The composition according to claim 1, wherein the ethylene polymer (c) is at least one substantially linear ethylene/α-olefin polymer having:

(a) a melt flow ratio, $I_{10}/I_2 \geq 5.63$;

(b) a molecular weight distribution, $M_w/M_n$, defined by the equation:

$$M_w/M_n \leq (I_{10}/I_2) - 4.63, \text{ and}$$

(c) a critical shear rate at onset of surface melt fracture of at least 50% greater than the critical shear rate at the onset of surface melt fracture of a linear ethylene/α-olefin polymer having about the same melt index ($I_2$) and $M_w/M_n$.

12. The composition of claim 1, wherein the weight ratio of impact modifier component (b) to ethylene polymer component (c) is at least 2:1.

13. A thermoplastic olefinic polymer composition having at least three phases comprising:

(a) isotactic polypropylene homopolymer;

(b) from 25 to 35 percent (by weight based on the total composition) of an elastomeric impact modifier which is an interpolymer of ethylene and at least one α-olefin having a density in the range from 0.855 to 0.870 g/cm$^3$ and a melt index ($I_2$) of less than 5 g/10 min., which is dispersed as discrete particles in the isotactic polypropylene homopolymer (a); and (c) from 10 to 20 percent (by weight based on the total composition) of at least one homogeneous linear or substantially linear ethylene polymer dispersed as discrete particles in at least the impact modifier (b), the ethylene polymer having a molecular weight distribution from 1.8 to 2.5 and a density of at least 0.04 g/cm$^3$ higher than the density of impact modifier (b) and which is in the range from 0.90 to 0.95 g/cm$^3$, wherein the tensile modulus of the isotactic polypropylene homopolymer (a) is at least 200 times greater than the tensile modulus of the impact modifier component (b).

14. The composition of claim 13, further characterized as having a tensile modulus of at least 1200 MPa, as determined in accordance with ASTM D-638 at a strain rate of 20 inch/min. and ambient temperature.

15. A thermoplastic olefinic polymer composition having at least three phases comprising:

(a) isotactic polypropylene homopolymer;

(b) from 25 to 35 percent (by weight based on the total composition) of an elastomeric impact modifier which is an interpolymer of ethylene, at least one α-olefin, and at least one diene, having a density in the range from 0.855 to 0.870 g/cm$^3$ and a Mooney viscosity measured according to ASTM D-1646 at 100° C. of at least 20, which is dispersed as discrete particles in the isotactic polypropylene homopolymer (a); and (c) from 10 to 20 percent (by weight based on the total composition) of at least one homogeneous linear or substantially linear ethylene polymer dispersed as discrete particles in the impact modifier (b), the ethylene polymer having a molecular weight distribution of from 1.8 to 2.5 and a density of at least 0.04 g/cm$^3$ higher than the density of impact modifier (b) and which is in the range from 0.90 to 0.95 g/cm$^3$, wherein the tensile modulus of the isotactic polypropylene homopolymer (a) is at least 200 times greater than the tensile modulus of the elastomeric impact modifier component (b).

16. The composition of claim 15, further characterized as having a tensile modulus of at least 1200 MPa, as determined in accordance with ASTM D-638 at a strain rate of 20 inch/min. and ambient temperature.

17. A process for making a thermoplastic olefinic polymer composition having at least three phases comprising mixing at an elevated temperature:

(a) a thermoplastic polymer resin matrix selected from the group consisting of thermoplastic polyurethanes, polyvinyl chlorides, styrenics, engineering thermoplastics, and polyolefins, (b) at least about 25 percent (by weight based on the total composition) of an elastomeric impact modifier; and (c) at least about 10 percent (by weight based on the total composition) of at least one homogeneous linear or substantially linear ethylene polymer, the ethylene polymer having a molecular weight distribution less than 3.5 and a density of at least 0.04 g/cm$^3$ higher than the density of the impact modifier component (b), wherein the tensile modulus of the thermoplastic component (a) is at least 200 times greater than the tensile modulus of the impact modifier component (b).

18. A process for fabricating an article comprising an impact-modified polyolefin comprising molding a composition according to claim 1.

19. A process for fabricating an article comprising an impact-modified polyolefin comprising thermoforming a composition according to claim 1.

20. A process for fabricating an article comprising an impact-modified polyolefin comprising extending a composition according to claim 1.

21. A fabricated article comprising the composition of claim 1.

22. The fabricated article of claim 21, selected from the group consisting of injection molded, blow molded, thermoformed, and profile extruded articles.

23. The fabricated article of claim 22, which is further selected from the group consisting of injection molded and thermoformed automotive components.

* * * * *

UNITED STATES PATENT AND TRADEMARK OFFICE
CERTIFICATE OF CORRECTION

Page 1 of 2

PATENT NO. : 5,861,463
DATED : January 19, 1999
INVENTOR(S) : Kalyan Sehanobish; Shaofu Wu; Larry A. Meiske; Pak-Wing Steve Chum It is certified that error appears in the above-identified patent and that said Letters Patent is hereby corrected as shown below:

Column 12, line 66: Replace "thermoplastic polymer resin" with --polypropylene--; delete "selected from the".

Column 12, line 67: Delete the entire line.

Column 13, line 1: Delete the entire line.

Column 13, line 2: Delete "and polyolefin".

Column 13, line 4: After "an" add the following --ethylene/α-olefin or an ethylene/α-olefin/diene--.

Column 13, line 5: Replace "thermoplastic" with --polypropylene--.

Column 13, line 15: Replace "thermoplastic" with --polypropylene--.

Column 13, line 50: Replace "thermoplastic" with --polypropylene--.

Column 14, line 53: Replace "thermoplastic polymer resin" with --polypropylene--; delete "selected from the".

Column 14, lines 54 and 55: Delete the entire lines.

UNITED STATES PATENT AND TRADEMARK OFFICE
CERTIFICATE OF CORRECTION

PATENT NO. : 5,861,463
DATED : January 19, 1999
INVENTOR(S) : Kalyan Sehanobish; Shaofu Wu; Larry A. Meiske; Pak-Wing Steve Chum It is certified that error appears in the above-identified patent and that said Letters Patent is hereby corrected as shown below:

Column 14, line 56: Delete "and polyolefins".

Column 14, line 58: After "an" add the following --ethylene/α-olefin or an ethylene/α-olefin/diene--.

Column 14, line 65. Replace "thermoplastic" with --polypropylene--.

Signed and Sealed this

Third Day of August, 1999

Attest:

Q. TODD DICKINSON

*Attesting Officer*  *Acting Commissioner of Patents and Trademarks*